US00RE35737E

United States Patent [19]

Sourlis et al.

[11] E Patent Number: Re. 35,737

[45] Reissued Date of Patent: Feb. 24, 1998

[54] ACCOUSTICALLY SOFT INK JET NOZZLE ASSEMBLY

[75] Inventors: George Sourlis, Arlington Heights; Nikodem Zyznieuski, Chicago; Robert I. Keur, Niles; Roger T. Slisz, Lombard, all of Ill.

[73] Assignee: Vidoejet Systems International, Inc., Elk Grove, Ill.

[21] Appl. No.: 572,580

[22] Filed: Dec. 14, 1995

Related U.S. Patent Documents

Reissue of:

[64] Patent No.: 4,727,379
Issued: Feb. 23, 1988
Appl. No.: 883,707
Filed: Jul. 9, 1986

U.S. Applications:

[63] Continuation of Ser. No. 843,596, Feb. 28, 1992, abandoned.

[51] Int. Cl.[6] ..... B41J 2/14; B41J 2/025

[52] U.S. Cl. ..... 347/47; 347/75; 347/94

[58] Field of Search ..... 347/47, 75, 94; 239/102.2, DIG. 19

[56] References Cited

U.S. PATENT DOCUMENTS

| | | | |
|---|---|---|---|
| 3,281,859 | 10/1966 | Stone | 347/75 |
| 3,281,860 | 10/1966 | Adams et al. | 347/75 |
| 3,334,350 | 8/1967 | Adams | 347/75 |
| 3,512,172 | 5/1970 | Colecchi | 347/75 |
| 3,683,212 | 8/1972 | Zoltan | 347/68 X |
| 3,683,396 | 8/1972 | Keur et al. | 347/75 |
| 3,708,118 | 1/1973 | Kuer | 347/75 X |
| 3,736,593 | 5/1973 | Kuer et al. | 347/75 |
| 3,787,884 | 1/1974 | Demer | 347/68 X |
| 3,832,579 | 8/1974 | Arndt | 347/68 |
| 3,850,717 | 11/1974 | Keur et al. | 156/86 |
| 3,946,398 | 3/1976 | Kyser et al. | 347/70 |
| 3,972,474 | 8/1976 | Keur | 34/75 X |
| 4,050,075 | 9/1977 | Hertz | 347/73 X |
| 4,153,901 | 5/1979 | White et al. | 347/75 |
| 4,201,995 | 5/1980 | Fischbeck et al. | 347/68 X |
| 4,204,215 | 5/1980 | Nakarai | 347/68 |
| 4,248,823 | 2/1981 | Bader et al. | 347/68 X |
| 4,257,052 | 3/1981 | Stoneburner | 347/47 |
| 4,286,018 | 8/1981 | Asakura | 428/332 |
| 4,319,251 | 3/1982 | Kuer | 347/76 |
| 4,333,086 | 6/1982 | Ebi | 347/55 |
| 4,349,830 | 9/1982 | Rudd | 347/47 |
| 4,376,944 | 3/1983 | Reitberger et al. | 347/47 |
| 4,379,303 | 4/1983 | Nakagaki et al. | 347/44 |
| 4,395,719 | 7/1983 | Majewski et al. | 347/68 |
| 4,437,611 | 3/1984 | Gilroy | 239/453 |
| 4,500,217 | 2/1985 | Swindler | 400/320 |
| 4,504,845 | 3/1985 | Kattner | 347/47 |
| 4,550,325 | 10/1985 | Viola | 347/68 |
| 4,630,072 | 12/1986 | Scardovi | 347/68 |
| 4,665,409 | 5/1987 | Behrens | 347/47 |
| 4,715,537 | 12/1987 | Calder | 239/119 |
| 4,725,862 | 2/1988 | Matsuzaki | 347/45 |
| 5,102,611 | 4/1992 | Wolfe | 264/568 |

FOREIGN PATENT DOCUMENTS

| | | | |
|---|---|---|---|
| 53-123458 | 10/1978 | Japan | B41J 1/00 |
| 59-54568 | 3/1984 | Japan | B41J 3/04 |

*Primary Examiner*—Joseph W. Hartary

[57] ABSTRACT

An *acoustically soft* ink jet nozzle [assembly is produced from materials, such as] *for continuous jets. The nozzle is a tubular member formed from* polyphenylene sulfide[. The resulting assembly is acoustically soft so that undesirable fluid and mechanical resonances are] (*RYTON*) *which has a* substantially [attenuated] *constant response over a transducer range of 10–100 KHz.*

5 Claims, 4 Drawing Sheets

RYTON
UNPOTTED
POTTED IN A BLOCK
DRIVE VOLTAGE RMS
0
10
20
30
0 10 20 30 40 50 60 70 80 90
FREQUENCY KHz

RYTON
INK NO 16-1000
VELOCITY OF SOUND ≈ 1600 m/s
DRIVE VOLTAGE RMS
0
10
20
30
0 10 20 30 40 50 60 70 80 90 100
FREQUENCY KHz

RYTON
INK NO. 16-7400
VELOCITY OF SOUND ≈ 1300 m/s
DRIVE VOLTAGE RMS
0
10
20
30
0 10 20 30 40 50 60 70 80 90 100
FREQUENCY KHz

RYTON
INK NO. 16-7600
VELOCITY OF SOUND ≈ 1230 m/s
DRIVE VOLTAGE RMS
0
10
20
30
0 10 20 30 40 50 60 70 80 90 100
FREQUENCY KHz

ACCOUSTICALLY SOFT INK JET NOZZLE ASSEMBLY

Matter enclosed in heavy brackets [ ] appears in the original patent but forms no part of this reissue specification; matter printed in italics indicates the additions made by reissue.

*This application is a continuation of Ser. No. 07/843,596, filed Feb. 28, 1992, now abandoned, which in turn is a reissue application of Ser. No. 06/883,707, filed Jul. 9, 1986, U.S. Pat. No. 4,727,379.*

BACKGROUND OF THE INVENTION

This invention relates to drop marking equipment and, in particular, to nozzles used in such drop marking equipment or ink jet devices. Such devices employ inks which are supplied from a reservoir to a nozzle. The nozzle directs ink at a substrate to be marked. By use of a transducer, electrical energy is converted into mechanical energy, which is coupled to the ink in the nozzle. In one example of ink jet operation, the stream of ink ejected from an orifice at one end of the nozzle is broken up into a series of regularly spaced, discrete droplets which may be selectively given an electrical charge. In that type of drop marking device, those drops which receive a charge are deflected onto a substrate while those which are not charged are recovered and returned to the ink supply. In another type of droplet marking device, the transducer applies an impulse of energy to the fluid in the nozzle each instance that a droplet is needed.

As is well known by those in the art, the complexity of such ink jet nozzles contribute to cost and speed limitations. For example, it is often desirable to group together several such nozzles to permit high sped printing on a substrate which may be, for example, magazines, envelopes, labels, beverage cans on other products moving on a conveyor. It is not uncommon for ink jet nozzles in some applications to be spaced as closely as six per inch and thus the need there for a low cost, high quality, miniaturized device is apparent.

A significant contributing factor to the complexity and cost of producing ink jet nozzles is the presence of both fluid and mechanical resonances in such assemblies which interfere with the nozzle's usefulnesses over the range of frequencies usually employed to form the ink droplets. Such resonance vary with the type of ink employed, temperature, and the geometric dimensions of the nozzle assembly. They are also significantly affected by the type of material used to manufacture the nozzle. As a result ink jet printers have required a variety of different nozzles to permit operation at different frequencies and for different kinds of inks.

Typically, ink jet nozzle assemblies have been manufactured from metal or glass materials and are acoustically "hard" meaning that they support acoustic resonances at certain frequencies with very little attenuation. The nozzle my vibrate in flexure, torsion, compression or all three imparting added mechanical energy to the ink stream at specific frequencies. Also a consideration in nozzle design is the fluid resonance, i.e., resonance in the ink contained within the nozzle body. If a fluid is confined in a chamber having a rigid wall, a standing wave is formed, in this case inside the fluid containing chamber. One standard nozzle design technique calls for configuring the nozzle assembly to have a mechanical resonance that is outside the operating frequency range of the nozzle, while the fluid chamber and ink are matched to have a fluid resonance in the operating frequency range. In that type of nozzle assembly, operation is restricted to frequencies substantially coincidental with the fluid resonance region because only in that region can energy be transmitted to the fluid efficiently and the droplets be formed reliably. As is well known according to acoustic principles involved in vibrating bodies, these nozzles have specific resonance frequencies for the fluids selected. The disturbing energy applied to the nozzle cannot be efficiently transmitted to the fluid to form droplets if the frequency selected for operation is not substantially coincidental with the resonance frequency of the selected fluid.

The present invention contemplates, at least in one aspect proceeding contrary to accepted wisdom by designing nozzles without resonance so as to eliminate the antiresonance regions in the operating frequency range and thereby extend the operating frequency range of the nozzle. To do that, acoustically soft materials were sought so that resonances would be substantially unsupported. This permits only the disturbing energy created by an electromechanical transducer, for example, a piezoelectric cyrstal, operating at a selected frequency to be transmitted to the fluid.

In the prior art efforts have been made to overcome the difficulties which arise from fluid and mechanical resonances. These are discussed in U.S. Pat. Nos. 4,379,303, 4,349,830, and 3,972,474, for example. Typically, reduction of fluid resonance has been attempted by using either a labyrinth of small passages or by making the nozzle body as short as possible. In general, these procedures move portions of the resonances to higher frequencies (usually outside the operating frequency range). However, harmonics of the undesirable resonances remain and show up in the operating frequency range of the nozzle.

According to the presence invention, a nozzle assembly is disclosed which employs an acoustically soft material which can overcome most or all of the disadvantages of present assemblies and which is more versatile than the latter because it provides additional advantages not heretofore obtainable. Specifically, according to the present invention. (1) the ink is electrically isolated from the transducer permitting the reference potential of the ink to be independently adjusted relative to the driving signal to the transducer, if desired; (2) the nozzle assembly can be formed by molding techniques and mass produced at low cost; (3) the operating frequency range of the nozzle is broadened by eliminating antiresonance regions; (4) electrolytic action can be controlled by use of an electrode and filter arrangement in the ink system including the nozzle.

SUMMARY OF THE INVENTION

The invention consists of fabricating nozzle bodies of a material which has a desired acoustic impedance. Specifically, the material from which the nozzles are fabricated is acoustically soft so that resonances are not supported by the nozzle structure. Instead, the driving energy is transmitted directly to the ink stream without amplification or attenuation due to variation in frequency response. The materials suitable for use in the present invention are generally described as acoustically soft plastics which can withstand certain solvents typically contained in the inks used for ink jet applications. The nozzles formed from such materials usually have an orifice in a wall of a fluid chamber through which ink is ejected to form droplets. In one instance, the orifice is formed in a jewel which is imbedded in the nozzle body and the transducer is adhesively bonded thereto. The nozzle and transducer are then incorporated into a nozzle assembly.

It is accordingly an object of the present invention to provide an improved ink jet nozzle assembly which minimizes both fluid and mechanical resonances.

It is a further object of the invention to provide such an assembly which is low in cost and easily produced without the usual machining steps required of present assemblies.

It is an additional object of the present invention to provide a nozzle assembly in which the disturbing energy is transmitted to the ink within the nozzle without substantial amplification attenuation or the creation of harmonic resonances of any frequency characterizing the disturbing energy.

It is another object of the invention to provide nozzle assemblies having an essentially flat response to frequencies characterizing the driving voltage over an entire range of frequencies at which ink droplets are formed by a transducer.

A further object of the invention is to provide a nozzle assembly which permits the ink to be electrically isolated from the transducer whereby the ink can be subjected to an electrical potential independent of the signal applied to drive the transducer for the purpose disclosed, for example, in U.S. Pat. No. 4,319,251, and for the further purpose of permitting the control of electrolytic action within the ink system of the ink jet device.

Other objects and advantages of the invention will be apparent from the remaining portion of the specification.

DETAILED DESCRIPTION

Figure 1:
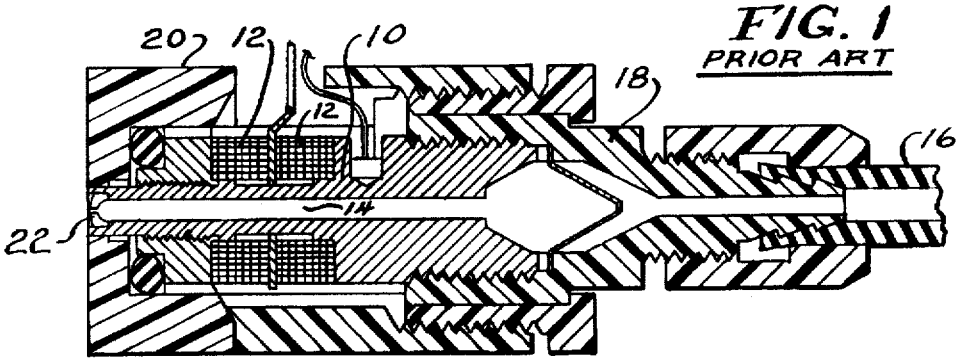
FIG. 1 PRIOR ART
FIG. 1 is an illustration from U.S. Pat. No. 3,702,118 and represents the construction of a typical prior art nozzle assembly.

As indicated in the background portion of this specification, the present invention relates to a nozzle assembly for ink jet printing which has significant advantages over present assemblies which are typically machined from metal, glass or other acoustically "hard" materials. Such prior nozzles, a typical example being illustrated in FIG. 1, are somewhat complex to design and manufacture particularly in view of their relatively small size. As a result they are expensive to produce and quality control is a continuing problem. By way of example, one such nozzle assembly made from metal requires a fabrication process that may take as much as 45 minutes or more of machining operations by skilled technicians. The nozzle 10 must be carefully machined so as to permit the concentric attachment of one or more transducers 12 in a manner to provide good acoustical coupling so that the ink chamber 14 will properly receive acoustic energy.

As known by those skilled in the art, one type of nozzle assembly used in an ink jet device which controls drop flight by electrical forces employs electrically conductive ink supplied from a reservoir via a conduit 16 to the nozzle assembly. The nozzle assembly consists of the nozzle 10, a tail piece 18, which interconnects the nozzle with the conduit 16, and the transducer 12. The assembly is usually provided in a block or head 20. Disposed at the front of the nozzle is an orifice 22, for example, a jewel having an opening through which the ink is forced. Vibrational energy is provided by the transducer and that causes the ink stream to break up into regularly-spaced, discrete droplets which can then be electrically charged and deflected by electrostatic deflection plates in a manner well known in this art.

Because the nozzle assembly shown in FIG. 1 is fabricated from metal or glass it is, as indicated, both expensive to make and acoustically hard. As a result, it is necessary to test each type of nozzle to determine in what frequency range it can be utilized. Specifically, it must be tested to determine what mechanical and fluid resonances are set up in the nozzle which might interfere with the intended operation.

Figure 4:
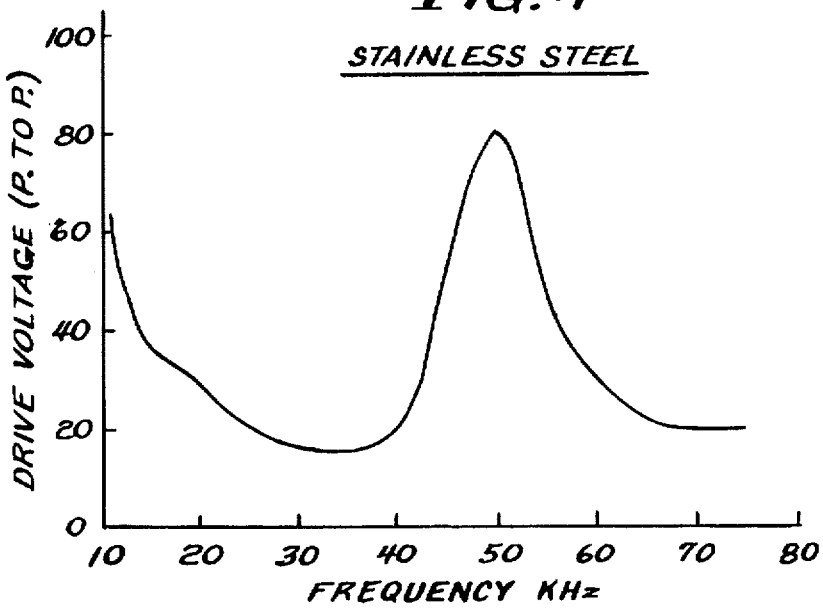
FIG. 4 is a curve illustrating typical response characteristics of prior art nozzle assemblies.

This is usually accomplished by testing the nozzle under actual operating condition. A curve is shown in FIG. 4 for a typical metal nozzle assembly. The curve is a plot of drive voltage as a function of operating frequency. The plot indicates the voltage needed to produce a constant stream of ink droplets at a specified frequency. As can be seen from FIG. 4, there is a range been approximately 20 KHz and 40 KHz where the drive voltage for the nozzle is relatively low. This indicates that in this frequency range the nozzle is efficient and the driving voltage remains substantially constant over a limited operating frequency range. On the other hand, in the frequency range of approximately 40 KHz to 60 KHz and also at frequencies below 20 KHz the required drive voltage increases significantly due to an increase in the acoustic impedance of the ink. Those are the antiresonance regions for the particular nozzle and ink match. Such variation in drive voltage is undesirable and requires the design of many nozzles in order to have a nozzle which is suitable for all frequency ranges of interest. Specifically, to operate at any given frequency using inks that have different physical properties, requires nozzles having different chamber configurations, for example, different lengths. The velocity of sound for each different ink is the physical property having the most significant effect on determining the nozzle configuration. Temperature at which the nozzle operates, of course, affects the velocity of sound for the ink used.

The resonances in nozzle assemblies are of two types: mechanical resonance and fluid resonance. Existing assemblies, usually formed from stainless steel tubing, have a mechanical resonance which, if in the operating range, can affect operation significantly. One common approach is to design the nozzle so that the mechanical resonance is well above the operating frequency range. That leaves fluid resonance only as a consideration in nozzle design. The ink chamber structure and the ink composition are matched to provide a fluid resonance region coincidental with the selected operating frequency. The fluid and mechanical resonances are responsible for the limited operating frequencies of existing, acoustically hard, nozzle assemblies.

For a nozzle to be useful over a range of frequencies it should operate at a substantially constant drive voltage level at all frequencies in the range required regardless of ink characteristics. Typical useful frequencies range from 10 KHz to 100 KHz (and sometimes higher). Typical inks suitable for use in ink jet printers have the following range of characteristics:

Surface tension: 22 to 72 dyne/cm

Viscosity: 1.5 to 10 centipoise

Density: 0.85 to 1.1 gm/cm$^3$

Velocity of sound: 1,000 to 1,650 m/s

The last characteristic, the velocity of sound in the ink, is of significant concern in the design of nozzles. The velocity of sound in such a fluid varies with the temperature of the fluid and, therefore, the fluid resonances (related to the velocity of sound) change frequency as a function of temperature changes in the nozzle. Thus, the resonances may be different during initial operation, when the nozzle is cool, than after the nozzle has been use for a period of time. Also, the velocity of sound is affected by changes in the composition of the ink due may mainly to evaporation of solvents.

According to the present invention these problems are overcome by the use of a nozzle assembly which is acoustically soft. Although there are many materials which might meet this criteria, it is necessary to consider the severe operating environment. The nozzle may need to be extremely small to work in some applications, subjected to continual temperature changes and vibration and, most importantly, is in contact with different inks containing water or various alcohols, ketones and other solvents. It is necessary, therefore, to select materials which can stand up to this environment in addition to being acoustically soft.

Through materials testing a number of materials were identified as being potentially suited for the application. These include acetal homopolymers (such as Delrin), acetal copolymers (such as Celcon GC 25), polypropylene, Teflon, polyphenylene sulfide (Ryton), polyphenylene oxide (Noryl).

These materials were selected for testing because they are moldable, have long term stability in contact with the solvents contained in typical inks and they were expected to be acoustically soft. It was believed that at least some of these materials would eliminate or attenuate resonances in the body of the nozzle (mechanical resonance) and in the ink (fluid resonance).

In order to determine which, if any, of these materials were suitable, nozzle bodies were designed, molded and tested.

Figure 3:
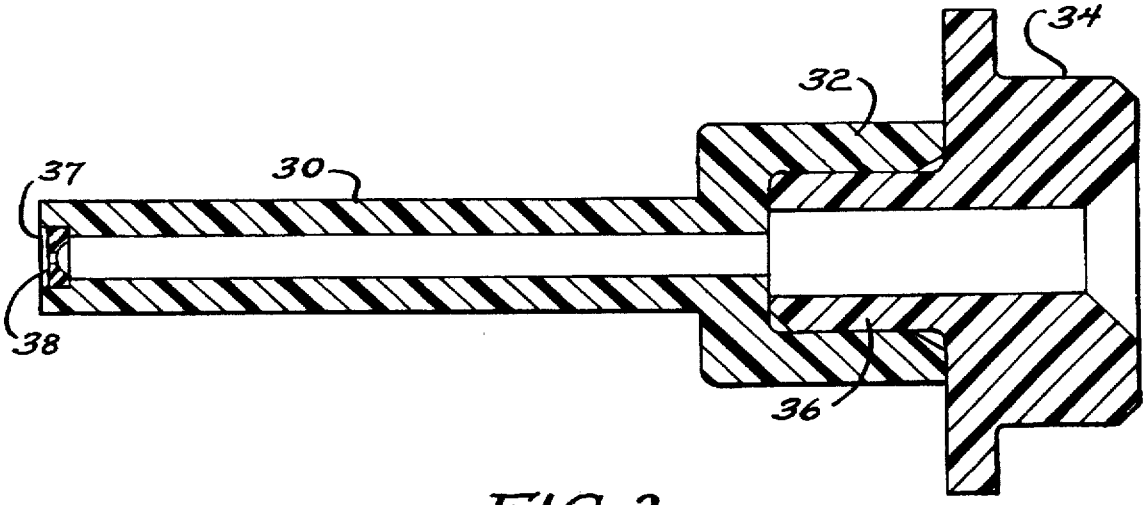
FIG. 3 is an enlarged sectional view of the nozzle and tail piece according to the preferred embodiment.

FIG. 3 illustrates the nozzle assembly molded from the various materials for purpose of testing. A nozzle 30 is an elongated, hollow cylindrical member. At one end thereof is a female coupling 32 adapted to receive a tail piece 34 having a male coupling member 36. The tail piece 34, in turn, can be coupled to a conduit member for providing an ink supply to the nozzle 30.

The distal end of the nozzle 30 has a recessed portion 37 adapted to receive and retain an orifice jewel 38 therein. Retention is accomplished by dimensioning the recess to provide an interference fit which firmly seats the jewel and prevents leakage. It was found that an interference fit of approximately 0.0015 inch was adequate to retain the jewel in place with a recess depth of approximately two times the thickness of the jewel. With such dimensions the nozzle material closes around the jewel to retain it securely in place.

Prior to testing the nozzle 30 of FIG. 3, a piezoelectric transducer was coupled by adhesive bonding. The bonding agent was selected to insure a good coupling between the piezoelectric device and the nozzle for transmission of energy to the fluid. Epoxies are preferred and, in particular, a one part binder which is not too viscous is best. This permits the binder to flow well in the space between the nozzle and the piezo electric device to avoid gaps which can cause undesirable variations in the applied energy, require higher drive voltages, contribute mechanical resonance and lead to premature failure of the device. Preferably the bonding material is relatively stiff to maintain drive efficiency. One suitable adhesive bonding agent is an anaerobic adhesive sold under the trade name Permalok by Permabond International Corporation, Englewood, N.J.

Completed test nozzles molded from the materials believed to be suitable were then subjected to testing. The results of these tests are illustrated in FIGS. 5 through 8. In each case the drive voltage, RMS or peak-to-peak as noted on the plots, necessary to maintain constant drop formation was plotted over a frequency range of 10 KHz to 100 KHz.

Figure 5:
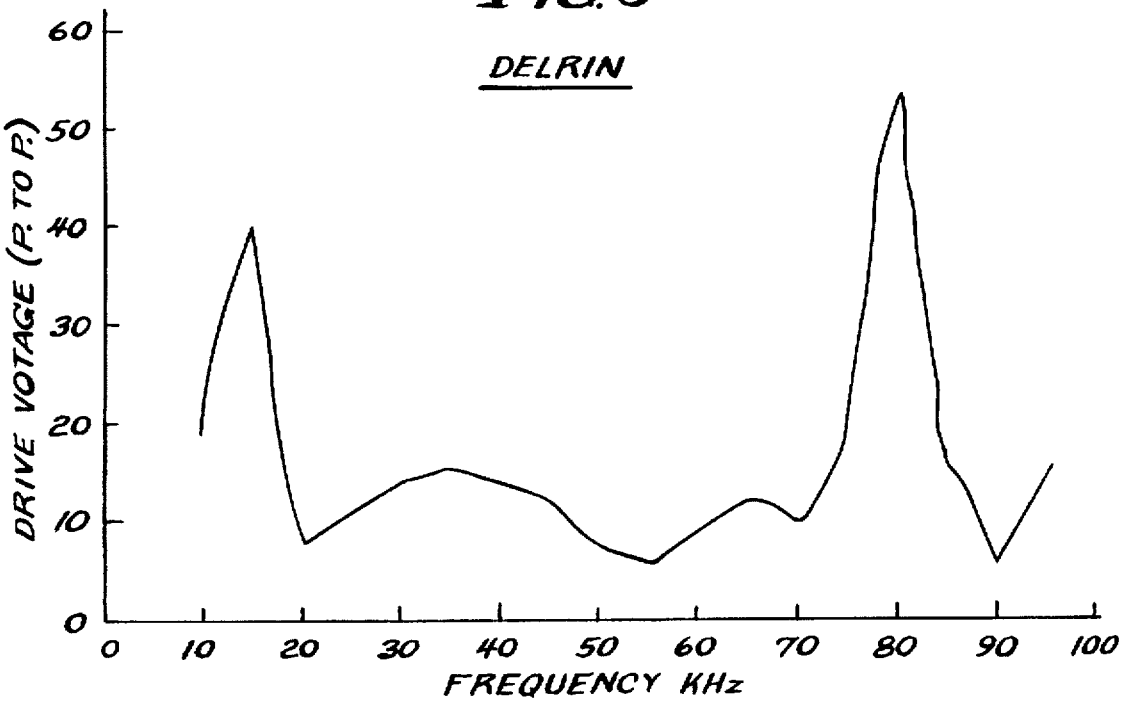
FIGS. 5 through 11 are similar curves illustrating the response characteristics for a number of different materials having various suitability for use in the present invention.

Referring to FIG. 5, the test results for the acetal homopolymer (Delrin) are shown. As can be seen, the drive voltage in the frequency range 20 KHz to 70 KHz is reasonably flat and less than approximately 15 volts. However, in the ranges of 10 to 20 KHz and 70 to 90 KHz significant antiresonances are encountered causing undesirable increases in the drive voltages. Nevertheless, this data compares quite favorably with the data for a typical metallic nozzle shown in FIG. 4.

Figure 6:
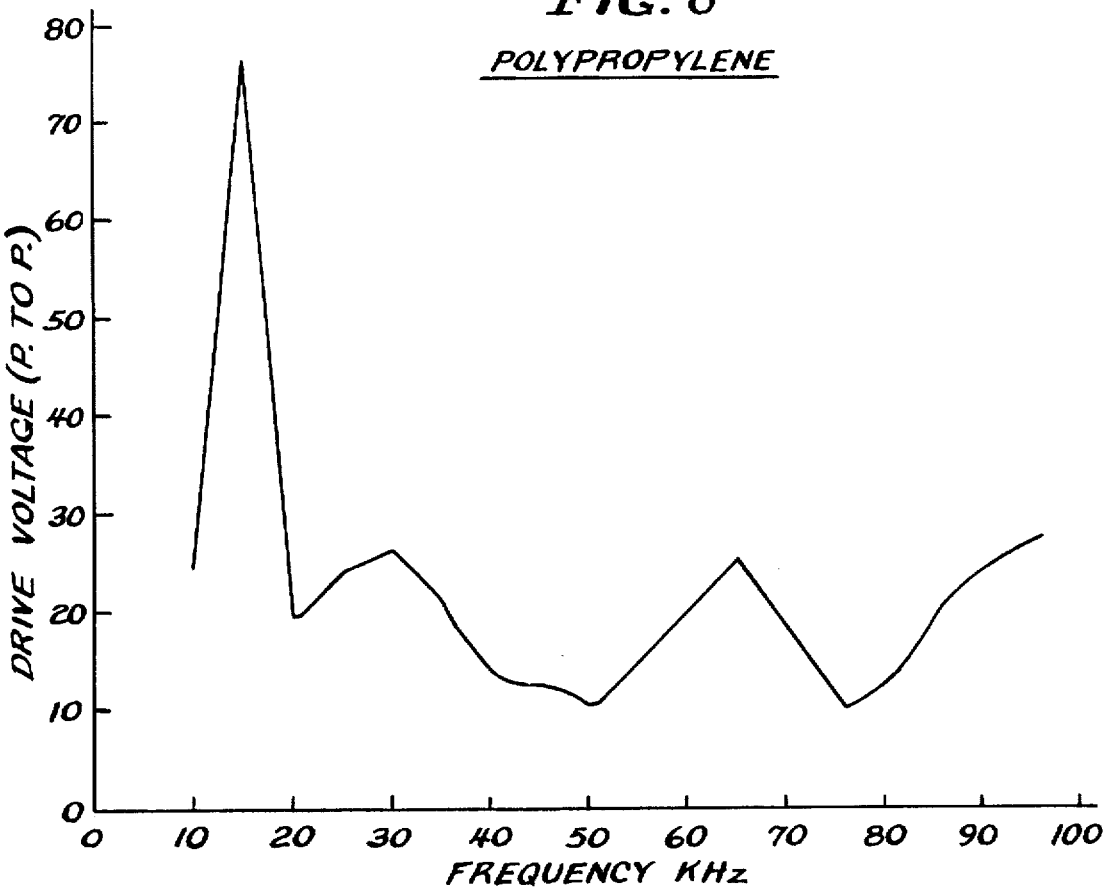

FIG. 6 shows the test data for polypropylene. It has a variety of antiresonances throughout the frequency range of interest and is therefore not suitable for present purposes.

Figure 7:
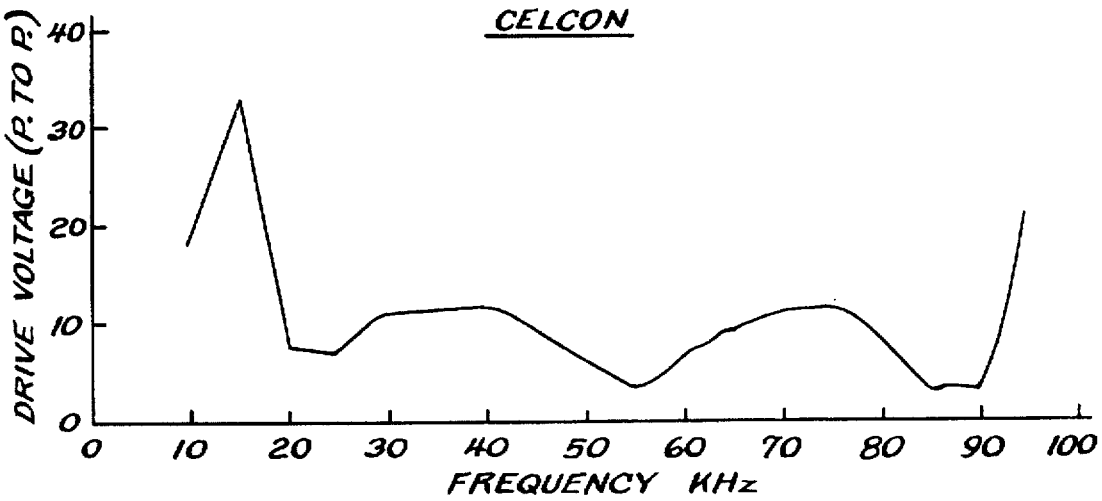

FIG. 7 illustrates the test data for the acetal coplymer (Celcon) which has undesirable antiresonances at 10 to 20 KHz and above 90 KHz.

Figure 8:
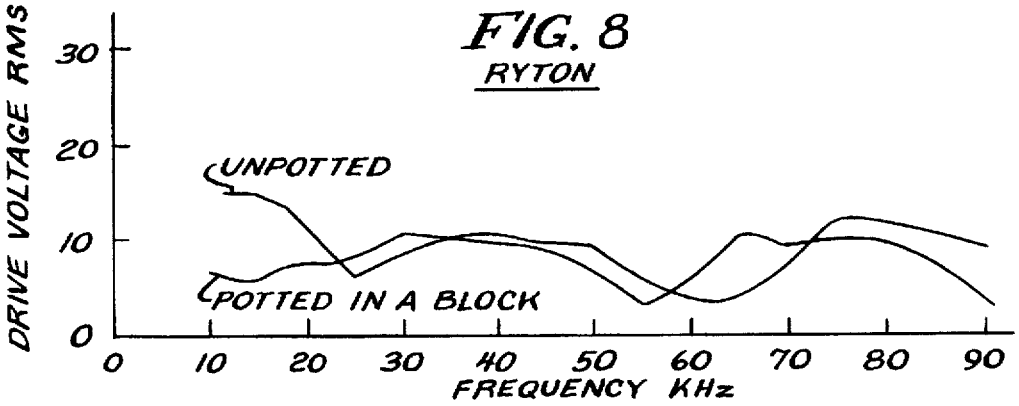

FIG. 8 illustrates the data for polyphenylene sulfide (Ryton) (two tests are shown, one in which the nozzle is potted in a block, the other unpotted). As can be seen, the material is much better than the prior art metal nozzles and significantly better than any of the other materials tested. Its response characteristic is essentially flat from 10 KHz to 100 KHz. This indicates, particularly in view of the low drive voltage required to maintain constant droplet production, that the material very efficiently couples the piezoelectric device and the fluid while at the same time being acoustically soft to not support fluid resonance. Because it is a molded part and is directly coupled to the driving device by an adhesive, there is little mechanical resonance created. This material was designated as the preferred material for the production of a new, highly efficient nozzle assembly for ink jet printing. Such a nozzle can be driven at a substantially uniform voltage over the desired operating range of frequencies.

Figure 9:
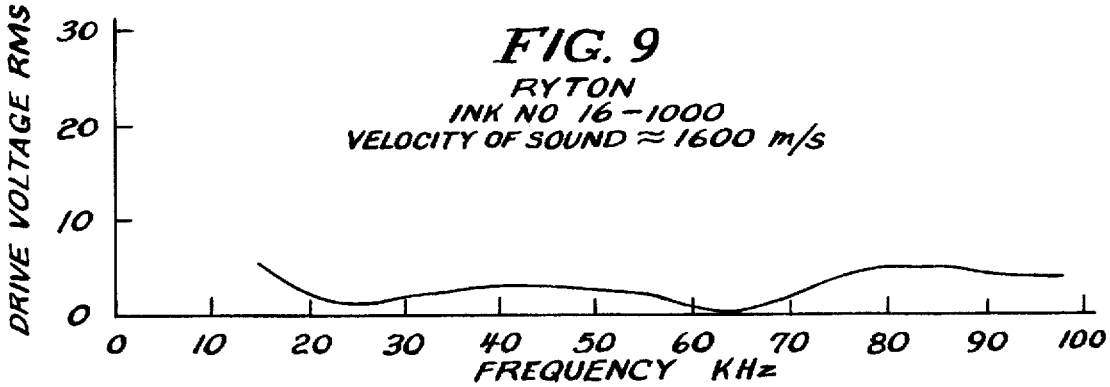
Figure 10:
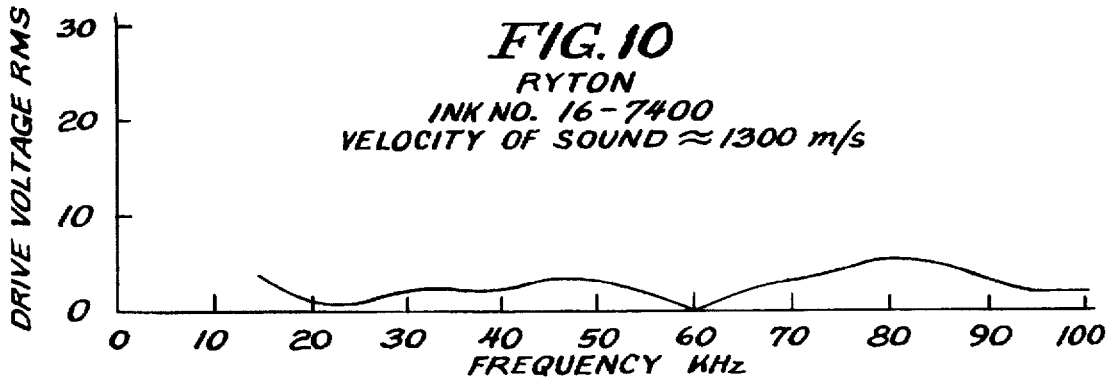
Figure 11:
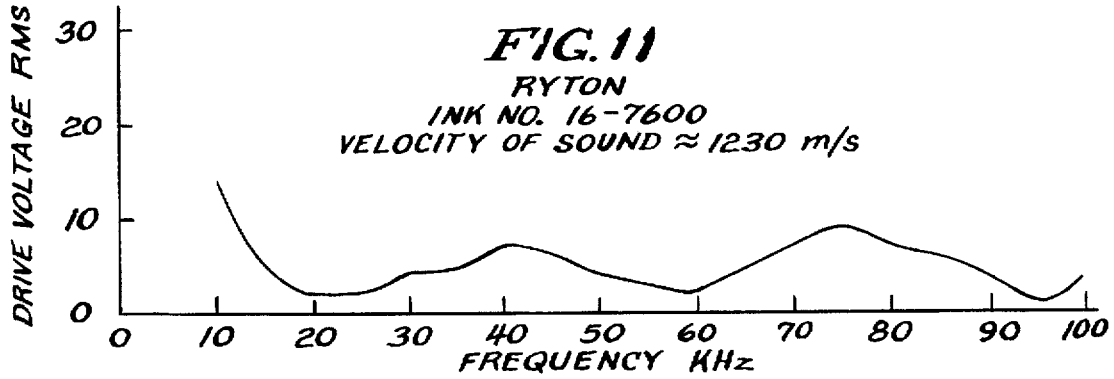

To verify the remarkable properties of this compound, additional tests were run using inks having different properties and, in particular, different velocity of sound values. The curves for this testing are illustrated in FIGS. 9 through 11. In each case the response curve for the Ryton was essentially flat over the frequency range of interest.

Although not as good as Ryton, Celcon and Delrin were also deemed to be acceptable materials for use under conditions where the antiresonances are outside the intended operating frequency. Materials found not to be suitable include polyurethane, polyvinyl chloride, styrene, polycarbonate, acrylic, ABS, and polyphenylene oxide. All of the suitable materials are moldable and chemical resistant thereby providing the desired properties. While these materials are [not] nonconductive electrically, that characteristic is not a requirement for many applications fo the present invention.

Figure 2:
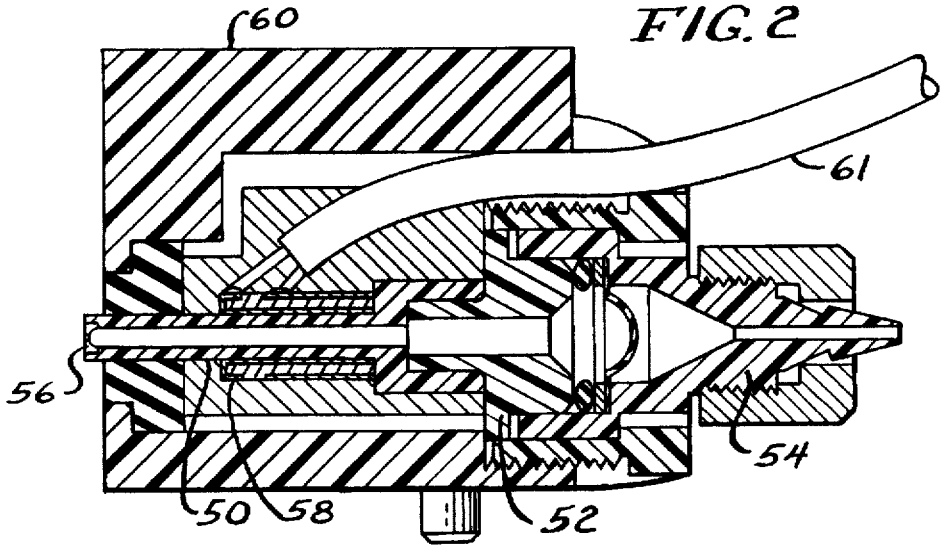
FIG. 2 is a cross sectional view of a nozzle assembly according to a preferred embodiment of the present invention.

Referring to FIG. 2, there is shown a preferred embodiment of the nozzle assembly employing the preferred materials of the present invention. A nozzle 50 formed of Ryton, Celcon or Delrin is coupled to a tail piece 52 preferably formed of the same materials. In turn, the tail piece is coupled to a fitting 54 for connection to an ink supply conduit. A jewel 56 is provided in the forward portion of the nozzle and captured therein by virtue of the dimensions of the nozzle recess as previously described. Concentrically mounted over the nozzle 50 is a piezoelectric transducer 58 adhesively bonded in place. The devices are electrically driven by means of a cable 61, the conductors contained therein being soldered to the outside of the transducers as indicated. The nozzle assembly is preferably potted and disposed within a nozzle head assembly or block 60. The completed assembly is small enough to permit spacing on the order of six separate print heads per inch. The nozzles made according to the teachings of the present invention have good, long term resistance to ink solvents, are relatively temperature insensitive, and can be driven an substantially uniform drive voltages over a wide range of operating frequencies. At the same time, because they are acoustically soft, the fluid does not "experience" a rigid confining wall and does not form standing waves which generate fluid resonance within the nozzle body. By eliminating fluid resonance, the antiresonances representing sharp increases in the acoustic impedance of the ink are also eliminated. Thus, droplet formation is accomplished across a broad frequency range by a substantially uniform driving voltage.

If desired, because of the electrical isolation of the ink within the nozzle body, an independently controlled potential may be applied to the ink permitting, for example, increased deflection by the techniques taught in U.S. Pat. No. 4,319,251. In addition, phasing of drop formation and drop charging is facilitated by permitting charging currents in the ink to be reliably detected.

While the invention has been described with reference to a preferred embodiment of a nozzle assembly having a single orifice through which ink is ejected, it is within the teachings of the present invention to provide a plurally of orifices in the nozzle assembly configured in an array. Either a separate chamber for each orifice or a common chamber for a plurality of orifices may be used dependent upon which droplet formation, technique is desirable in the particular ink jet device in which the nozzle is employed. There is ink confined to the chamber in either instance, and forming the wall or walls of the nozzle ink chamber of acoustically soft material in accordance with the teachings of the present invention assures that the disturbing energy coupled to the chamber is transmitted to the ink within the chamber without substantial amplification, attenuation or the creation of harmonic resonance of any frequency characterizing the disturbing energy.

The present invention is useful also in ink jet printers that employ a pulsed nozzle to form droplets. Zolton U.S. Pat. No. 3,683,212 discloses one example of that type of nozzle. The impulses of electrical energy used to drive such a nozzle commonly have a duration of 10 microseconds to 100 microseconds. A Fourier analysis of those energy pulses manifests that reliable droplet formation necessitates that the nozzle respond consistently to frequencies in the range of 10 KHz to 100 KHz. It is desirable that the nozzle chamber not support fluid resonances in that frequency range. A nozzle which has a fluid chamber with walls made of acoustically soft material as taught by the present invention will not support resonances in that region, and thus will have a substantially flat response to energy impulses characterized by frequencies that are within the operating frequency range. As a result, droplet formation is more nearly proportional to the characteristics of the energy pulse applied to the fluid to improve control and enhance the marking results. In addition, spurious oscillations in the impulse nozzle ink chamber that occur after a pulse has directed formation of a droplet are absorbed if the walls are made of acoustically soft material. Those spurious oscillations can distort the energy applied to the fluid when a succeeding command pulse is transmitted to the fluid. Clearly, an impulse or pulse driven nozzle can be operated more advantageously by following the teachings of the present invention.

While we have shown and described embodiments of the invention, it will be understood that this description and illustrations are offered merely by way of example, and that the invention is to be limited in scope only as to the appended claims.

What is claimed is:

1. [A] *In a continuous jet printer of the type which produces a continuous stream of ink droplets which are projected toward a substrate and are selectively electrically charged and deflected to mark the substrate, the improvement comprising:*

*a. a transducer producing a disturbing energy at a frequency within the range of approximately 10 KHz to 100 KHz;*

*b. a* nozzle suitable for use with [a] *said* transducer to form *said continuous stream of* ink droplets comprising[:] a tubular member *for coupling the disturbing energy to the ink said member* having an orifice at one end, the other end adapted for connection to a supply of ink containing solvents, said tubular member being formed from *Ryton* a material which is substantially impervious to said [ink and which] *ink*, is acoustically soft, [whereby when a transducer is coupled to said tubular member the disturbing energy thereof is transmitted to the ink within the tubular member without substantial] *and has a substantially constant response to the disturbing energy over said frequency range to minimize* amplification, attentuation or the creation of harmonic resonances of a frequency characterizing the disturbing energy.

2. The nozzle according to claim 1 wherein said tubular member is molded as a single piece [from a material selected from the group comprising: Celcon, Delrin, Ryton].

[3. The nozzle according to claim 1 wherein the nozzle has a substantially flat response to the driving voltage frequency generating the disturbing energy over the range of approximately 10 KHz to 100 KHz.]

4. [A] *In a continuous jet printer of the type which produces a continuous stream of ink droplets which are projected toward a substrate and are selectively electrically charged and deflected to mark the substrate, the improvement comprising:*

*a* nozzle assembly to form *a continuous stream of* ink droplets for an ink jet printer comprising:

*a. transducer producing a disturbing energy at a frequency within the range of approximately 10 KHz to 100 KHz;*

[(a)] *b.* a tubular member having an orifice at one end, the other end adapted for connection to a supply of ink containing solvents[;] *for coupling said* [(b) a transducer coupled to said nozzle for transmission of a] disturbing energy [through said tubular member to cause the ink] *to the ink* to form droplets, as it leaves the orifice;

[(c)] *c.* said tubular member being formed from *Ryton* a material which is substantially impervious to said ink [and which] *ink*, is acoustically soft,

[whereby the disturbing energy is transmitted to the ink within the tubular member without substantial] *and has a substantially constant response to the disturbing energy over said frequency range to minimize* amplification, attentuation or creation of harmonic resonances of a frequency characterizing the disturbing energy.

5. The nozzle according to claim 4 wherein said transducer is mounted on said tubular member and coupled thereto by adhesive bonding with a bonding agent which is relatively stiff to insure efficient coupling of the disturbing energy to the tubular member.

6. The nozzle according to claim 5 wherein said bonding agent is an anaerobic adhesive.

[7. A nozzle suitable for use with a transducer to form ink droplets comprising:

a tubular member having an orifice at one end, the other end adapted for connection to a supply of ink containing solvents, said tubular member being formed from a material which is substantially impervious to said ink and which has a substantially flat response to a driving voltage frequency characterizing the disturbing energy at least over the frequency range of 20 KHz to 70 KHz, whereby when the transducer is coupled to said tubular member the disturbing energy thereof is transmitted to the ink within the nozzle without substantially amplification, attentuation or creation of harmonic resonances of a frequency characterizing the disturbing energy.]

[8. The nozzle according to claim 7 wherein said tubular member is molded as a single piece from a material selected from the group comprising: Celcon, Delrin, Ryton polymers]

[9. The nozzle according to claim 7 wherein said tubular member is molded as a single piece from Ryton and the response to the transducer disturbing frequency is substantially flat over the frequency range of 10 KHz to 100 KHz.]

[10. A nozzle assembly to form ink droplet for an ink jet comprising:

(a) a tubular member having an orifice at one end, the other end adapted for connection to a supply of ink containing solvents;

(b) a transducer responsive to a driving signal for generating disturbing energy coupled to said tubular member to cause the ink to form droplets as it leaves the orifice;

(c) said tubular member being formed from a material which is substantially impervious to said ink and which has a substantially flat response to the driving signal frequency at least over the frequency range of 20 KHz to 70 KHz, whereby the distributing energy is transmitted to the ink within the tubular member without substantial amplification, attentuation or creation of harmonic resonances of one or more frequencies characterizing the disturbing energy.]

[11. The nozzle according to claim 10 wherein said transducer is coupled to said tubular member by adhesive bonding with a bonding agent which is relatively stiff to insure efficient coupling of the disturbing energy to the tabular member.]

[12. The nozzle according to claim 10 wherein said bonding agent is an anaerobic adhesive.]

[13. A nozzle suitable for use with a transducer to form ink droplets comprising:

a tubular member having an orifice at one end, the other end adapted for connection to a supply of ink containing solvents, said nozzle being formed from a material which is:

(a) resistant to said ink, (b) acoustically soft, and (c) has a substantially flat response to the driving signal frequency generating the disturbing energy at least over the range of 20 KHz to 70 KHz, whereby when a transducer is coupled to said tubular member the disturbing energy thereof is transmitted to the ink within the tubular member without substantial amplification, attentuation or creation of harmonic resonances of the driving signal frequency.]

[14. The nozzle according to claim 13 wherein said tubular member is molded as a single piece from Ryton and the response to the transducer driving signal is substantially flat over the frequency range of 10 KHz to 100 KHz.]

[15. A nozzle suitable for use with a transducer to form ink droplets comprising:

a hollow chamber connected to a supply of ink containing solvents, adapted to confine a volume of said ink to be ejected through an orifice in a wall thereof, said chamber being formed from an acoustically soft material which is substantially resistant to said ink, whereby when a transducer is coupled to said chamber the disturbing energy thereof is transmitted to the ink within the chamber without substantial amplification, attenuation or the creation of harmonic resonances of one or more frequencies characterizing the disturbing energy.]

[16. A method of forming ink droplets from a supply of ink comprising the steps of:

supplying the ink to a chamber, the walls of which are formed of acoustically soft material and which have at least one outlet therefrom through which ink may pass;

creating a disturbing energy characterized by one or more predetermined frequencies;

transmitting said energy to said ink through said acoustically soft chamber walls to form droplets as the ink passes out of the chamber;

whereby the disturbing energy is transmitted to the ink without substantially amplification, attenuation or the creation of harmonic resonances of said one or more frequencies characterizing said disturbing energy.]

* * * * *